Patented Aug. 28, 1945

2,383,524

UNITED STATES PATENT OFFICE 2,383,524

RESOLUTION OF RACEMIC ALPHA-HY-DROXY-β,β-DIMETHYL - GAMMA - BUTYR-OLACTONE

Max Tishler, Rahway, and Ralph H. Beutel, Newark, N. J., assignors to Merck & Co., Inc., Rahway, N. J., a corporation of New Jersey No Drawing. Application April 7, 1943, Serial No. 482,146

8 Claims. (Cl. 260—344)

This invention relates generally to improvements in methods of separating stereomeric organic chemical substances and in a more limited sense, it is concerned with a novel method for separating stereomeric forms of an intermediate used in synthesizing growth-promoting substances having the physiological activity of pantothenic acid.

To illustrate the application of the broad principles of this invention to the chemical arts generally, the invention will be disclosed in terms of its use in the resolution of certain substances, but without the intention to restrict the invention thereto.

In accordance with one method for preparing pantothenic acid or its derivatives possessing similar physiological activity, β-alanine or a compound capable of yielding β-alanine is condensed with α-hydroxy-β,β-dimethyl-gamma-butyrolactone, hereinafter referred to as "the lactone" or a chemical equivalent thereof. In this condensation, the laevorotatory form of the lactone must be used because if the dextrorotatory form of the lactone is used, the product does not possess the desired physiological activity hence resolution of the racemic lactone obtained by synthetic means is essential before condensation if satisfactory yields of the desired product are to be obtained.

Various methods have been developed by workers in this field for separation of the lactone stereomers. Resolution has been obtained by treating the lactone with aqueous alkali to form a salt of the corresponding butyric acid, reacting this salt with a quinine salt, separating the acid-alkaloid stereomers with preferential solvents, decomposing one of the stereomers to obtain the corresponding acid, and converting the acid to the desired laevorotatory lactone.

According to the present invention, the racemic lactone is resolved into its stereomers by treatment with a diacyl-d-tartaric acid anhydride whereby a mixture of the diacyl-d-tartaric acid esters of both stereomers is formed, treating the mixture with pyridine to form pyridine salts of the lactone-ester stereomers, and separating the pyridine salt of the diacyl-d-tartaric acid ester of the laevorotatory lactone by means of its sparing solubility in benzene. The reaction can be indicated as follows:

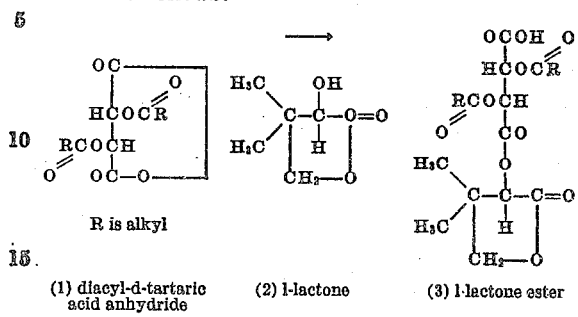

(1) diacyl-d-tartaric acid anhydride  (2) l-lactone  (3) l-lactone ester

After the above reaction has occurred, the diacyl-d-tartaric ester of the l-lactone, hereinafter referred to as the lactone-ester, is converted to its pyridine salt which appears as a crystalline mass in the reaction mixture. This mass is removed, purified and then hydrolyzed to yield the pure laevorotatory lactone. The pyridine salt of the dextrorotatory lactone-ester remains dissolved in the benzene solution.

Diacyl d-tartaric anhydride (1) which will be referred to hereinafter as "the anhydride," can be prepared by reacting an organic acid anhydride (4) with the calculated quantity of d-tartaric acid (5) in the presence of a relatively small quantity of sulfuric acid and may be indicated as follows:

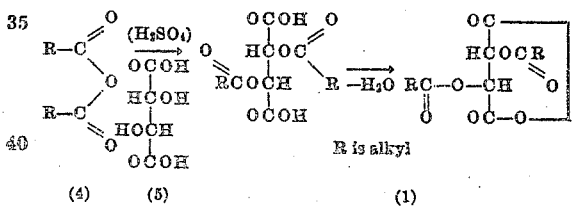

(4)  (5)  (1)

The following examples illustrate methods of carrying out the present invention, but it is to be understood that these examples are given by way of illustration and not of limitation, and that the principles of this invention may be applied in the resolution of stereomeric forms of substances capable of reacting with an organic acid anhydride, for example, substances having the functional groups —OH, —NH$_2$, —NRH, etc.

*Example 1*

About 21.6 g. of the anhydride, approximately 12.9 g. of the racemic lactone, and about 25 cc. of benzene are heated gently to form a uniform mixture to which, after cooling to about ordinary room temperature, approximately 8.5 cc. of pyridine are added with agitation during the addition. After standing and cooling, the crystalline material present is removed by filtration, washed with isopropanol, then with petroleum ether, and crystallized from alcohol. The product obtained, the pyridine salt of the lactone-ester, is converted to the lactone-ester by treating it, while suspended in water, with a mineral acid such as hydrochloric acid. The lactone-ester precipitates, is then removed by filtration, washed with water and dried.

*Example 2*

About 64.5 g. of the freshly distilled racemic lactone, approximately 108 g. of the anhydride and 250 cc. of anhydrous benzene are gently heated to produce a uniform mixture to which, after cooling to ordinary room temperature, 79 g. of dry pyridine are added with vigorous agitation during the addition. The mixture is maintained below about 50° C. during the addition by cooling, and a viscous yellow solution is obtained. After standing and cooling, the mixture is filtered to remove crystalline material present which is then washed with benzene and petroleum ether, boiled with about 400 cc. of isopropanol, cooled, mixed with approximately 400 cc. of anhydrous ether and filtered to yield the product, the pyridine salt of the lacetone-ester. This salt can be converted to the lacetone-ester by treatment with a mineral acid as in the preceding example.

It will be obvious to all versed in this field of invention that in the foregoing examples other acylated d-tartaric acid anhydrides can be substituted for the anhydride mentioned without departure from the present invention.

The lacetone ester obtained as described in the foregoing examples or, if preferred, the pyridine salt of the lacetone ester directly, can be hydrolyzed in the usual manner, for example by refluxing or similar treatment with a mineral acid or equivalent, and thereby yield the pure laevo stereomer of the lactone.

Modifications may be made in carrying out the present invention without departing from the spirit and scope thereof and the invention is to be limited only by the appended claims.

What is claimed is:

1. The process that comprises treating racemic α - hydroxy-β,β-dimethyl-gamma-butyrolactone in benzene with a diacyl-d-tartaric acid anhydride to form a mixture of the esters of the dextrorotatory and the laevorotatory lactone stereomers, treating the mixture with pyridine to form pyridine salts of the lactone-esters, and separating the sparingly soluble pyridine salt of the laevorotatory lactone-ester from the reaction mixture.

2. The process that comprises treating racemic α - hydroxy-β,β-dimethyl-gamma-butyrolactone in benzene with diacetyl-d-tartaric acid anhydride to form a mixture of the esters of the dextrorotatory and the laevorotatory lactone stereomers, treating the mixture with pyridine to form pyridine salts of the lactone-esters, and separating the sparingly soluble pyridine salt of the laevorotatory lactone-ester from the reaction mixture.

3. The process that comprises treating racemic α - hydroxy-β,β-dimethyl-gamma-butyrolactone with a diacyl-d-tartaric acid anhydride to form a l-lactone-ester, reacting said ester with pyridine to form the pyridine salt thereof, separating said pyridine salt from the reaction mixture, and converting said salt to the l-lactone ester by treatment with an acid.

4. The process that comprises treating racemic α - hydroxy-β,β-dimethyl-gamma-butyrolactone with diacetyl-d-tartaric acid anhydride to form a l-lactone-ester, reacting said ester with pyridine to form the pyridine salt thereof, separating said pyridine salt from the reaction mixture, and converting said salt to the l-lactone ester by treatment with an acid.

5. A diacylated d-tartaric acid ester of laevorotatory α-hydroxy-β,β - dimethyl - gamma - butyrolactone.

6. The diacetyl-d-tartaric acid ester of laevorotatory α-hydroxy-β,β - dimethyl - gamma - butyrolactone.

7. The pyridine salt of a diacylated d-tartaric acid ester of laevorotatory α-hydroxy-β,β-dimethyl-gamma-butyrolactone.

8. The pyridine salt of the diacetyl d-tartaric acid ester of laevorotatory α-hydroxy-β,β-dimethyl-gamma-butyrolactone.

MAX TISHLER.
RALPH H. BEUTEL.